(12) United States Patent
Oikawa et al.

(10) Patent No.: US 10,513,069 B2
(45) Date of Patent: Dec. 24, 2019

(54) METHOD FOR MANUFACTURING LIQUID SUPPLY MEMBER

(71) Applicant: CANON KABUSHIKI KAISHA, Tokyo (JP)

(72) Inventors: Satoshi Oikawa, Yokohama (JP); Yukuo Yamaguchi, Tokyo (JP); Mikiya Umeyama, Tokyo (JP); Hiromasa Amma, Kawasaki (JP); Takuya Iwano, Inagi (JP); Satoshi Kimura, Kawasaki (JP); Naoko Tsujiuchi, Kawasaki (JP); Yasushi Iijima, Tokyo (JP); Kyosuke Toda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 409 days.

(21) Appl. No.: 15/157,890

(22) Filed: May 18, 2016

(65) Prior Publication Data
US 2016/0346970 A1  Dec. 1, 2016

(30) Foreign Application Priority Data

May 25, 2015  (JP) .................................. 2015-105149

(51) Int. Cl.
*B29C 45/33* (2006.01)
*B29C 45/00* (2006.01)
(Continued)

(52) U.S. Cl.
CPC .......... *B29C 45/33* (2013.01); *B29C 45/0062* (2013.01); *B29C 45/332* (2013.01);
(Continued)

(58) Field of Classification Search
CPC ................ B29C 45/0062; B29C 45/33; B29C 2045/0063; B29C 2045/328;
(Continued)

(56) References Cited

U.S. PATENT DOCUMENTS 6,145,965 A   11/2000  Inada et al.
6,243,117 B1   6/2001  Brandon et al.
(Continued)

FOREIGN PATENT DOCUMENTS

CN     1142439 A    2/1997
CN   102814913 A   12/2012
(Continued)

OTHER PUBLICATIONS

Amma et al., U.S. Appl. No. 15/156,583, filed May 17, 2016.
(Continued)

*Primary Examiner* — William P Bell
*Assistant Examiner* — Andrew L Swanson
(74) *Attorney, Agent, or Firm* — Venable LLP

(57) ABSTRACT

There is provided a manufacturing method for molding a liquid supply member by using a first mold and a second mold. The method includes a first molding step of performing injection molding to form a first component part of the liquid supply member and a plurality of component parts of the liquid supply member other than the first component part at different positions from each other, with the first and the second mold closed relative to each other, a contacting step of moving each of the formed plurality of component parts relatively to the first component part to bring the formed first component part into contact with the formed plurality of component parts, with the first and the second mold opened relative to each other, and a second molding step of performing injection molding to join the first component part and the plurality of component parts.

7 Claims, 14 Drawing Sheets

(51) Int. Cl.
 *B29L 31/00* (2006.01)
 *B29C 45/32* (2006.01)
(52) U.S. Cl.
 CPC .. *B29C 2045/328* (2013.01); *B29C 2045/334* (2013.01); *B29C 2045/336* (2013.01); *B29C 2045/338* (2013.01); *B29L 2031/7678* (2013.01)
(58) Field of Classification Search
 CPC ........ B29C 2045/334; B29C 2045/336; B29C 45/332; B29C 2045/338; B29L 2031/7678
 See application file for complete search history.

(56) References Cited

U.S. PATENT DOCUMENTS

| | | | |
|---|---|---|---|
| 6,365,083 B1 * | 4/2002 | Nishida | B29C 45/0062 264/255 |
| 6,428,730 B1 | 8/2002 | Nishida et al. | |
| 8,388,114 B2 | 3/2013 | Yamaguchi et al. | |
| 9,764,554 B2 | 9/2017 | Amma et al. | |
| 2001/0003867 A1 * | 6/2001 | Kawamura | B29C 45/006 29/858 |
| 2002/0028889 A1 * | 3/2002 | Nakamura | C08L 77/00 525/432 |
| 2010/0171798 A1 * | 7/2010 | Yamaguchi | B41J 2/16532 347/85 |
| 2012/0306972 A1 | 12/2012 | Yokota et al. | |
| 2016/0201620 A1 * | 7/2016 | Yano | F02M 35/10321 123/184.27 |
| 2016/0346967 A1 | 12/2016 | Oikawa et al. | |
| 2016/0346968 A1 | 12/2016 | Kimura et al. | |
| 2016/0346969 A1 | 12/2016 | Toda et al. | |
| 2016/0346971 A1 | 12/2016 | Iwano et al. | |
| 2016/0346976 A1 | 12/2016 | Tsujiuchi et al. | |
| 2016/0347072 A1 | 12/2016 | Iwano et al. | |

FOREIGN PATENT DOCUMENTS

| | | | | |
|---|---|---|---|---|
| JP | 2000-141415 A | | 5/2000 | |
| JP | 2000-153538 A | | 6/2000 | |
| JP | 2001-272109 A | | 10/2001 | |
| JP | 2002079542 A | * | 3/2002 | ......... B29C 45/0062 |
| JP | 2002-178538 A | | 6/2002 | |
| JP | 2005-022252 A | | 1/2005 | |
| JP | 2010-194747 A | | 9/2010 | |
| JP | 2012-192749 A | | 10/2012 | |

OTHER PUBLICATIONS

Oikawa et al., U.S. Appl. No. 15/151,880, filed May 11, 2016.
Iwano et al., U.S. Appl. No. 15/156,649, filed May 17, 2016.
Tsujiuchi et al., U.S. Appl. No. 15/157,909, filed May 18, 2016.
Iwano et al., U.S. Appl. No. 15/156,578, filed May 17, 2016.
Toda et al., U.S. Appl. No. 15/156,559, filed May 17, 2016.
Kimura et al., U.S. Appl. No. 15/156,569, filed May 17, 2016.
First Office Action in Chinese Application No. 201610349021.3 (dated Nov. 3, 2017).
Notification of Reasons for Refusal in Japanese Application No. 2015-105149 (dated Jan. 29, 2019).

* cited by examiner

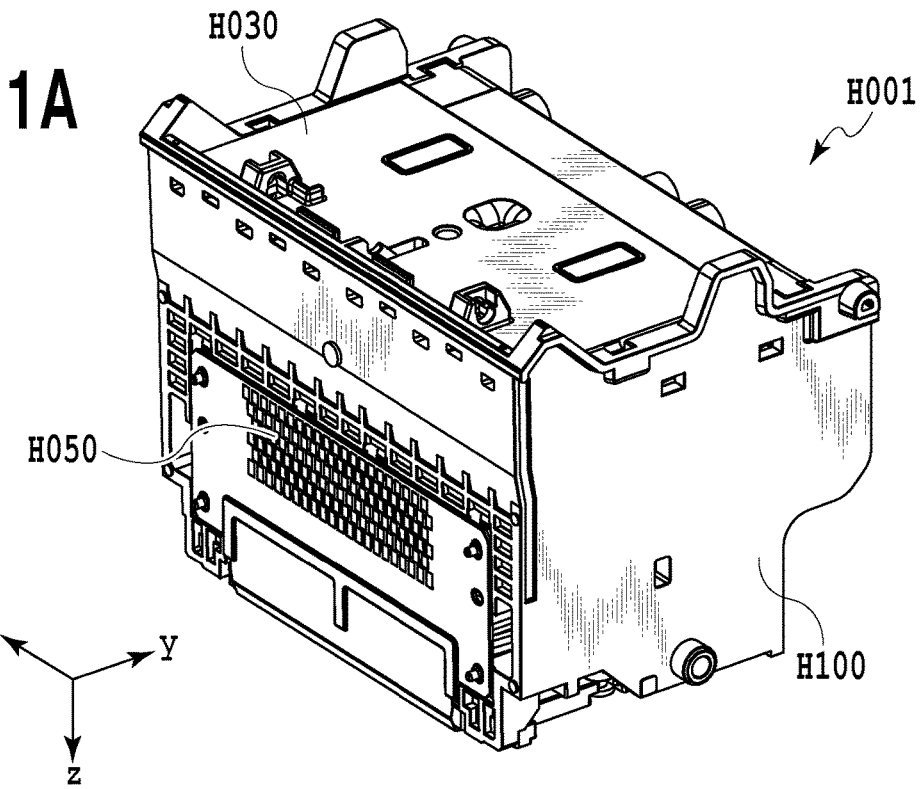
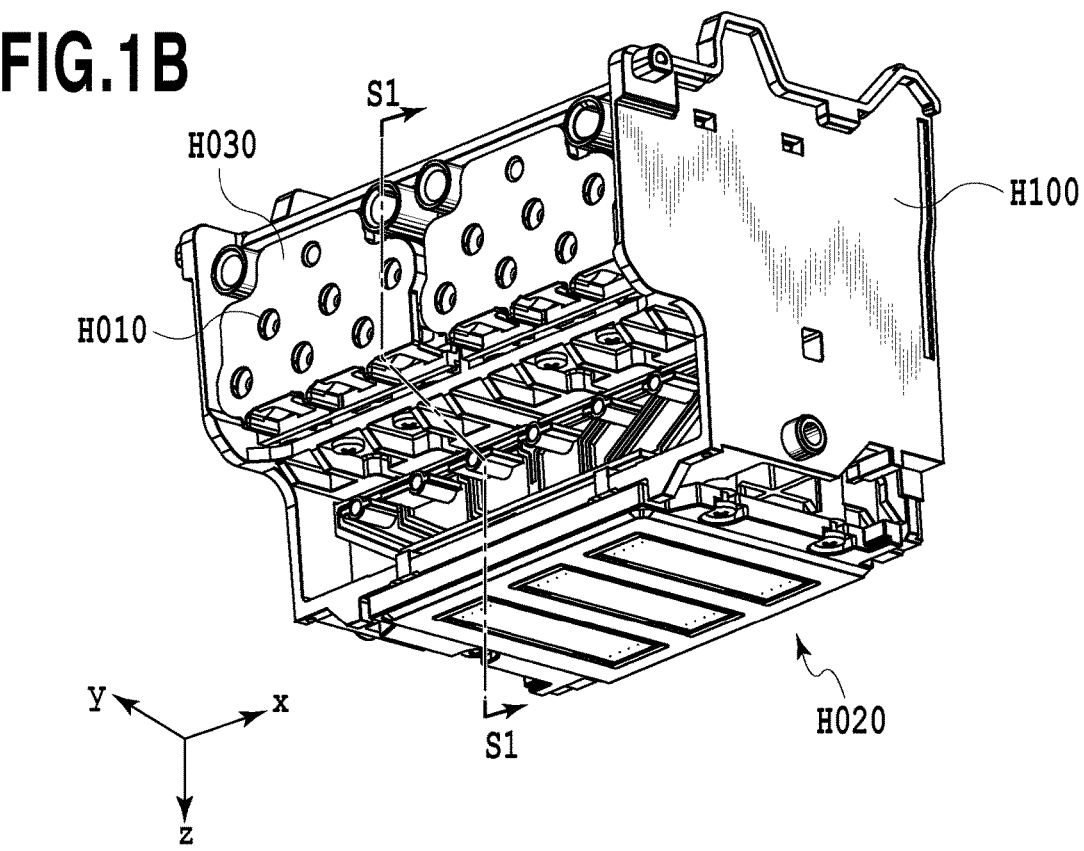

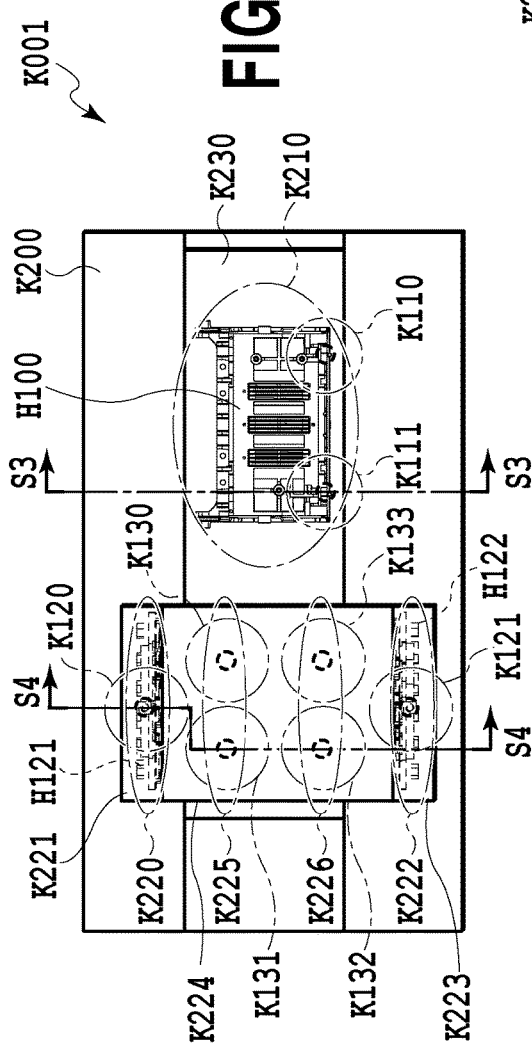

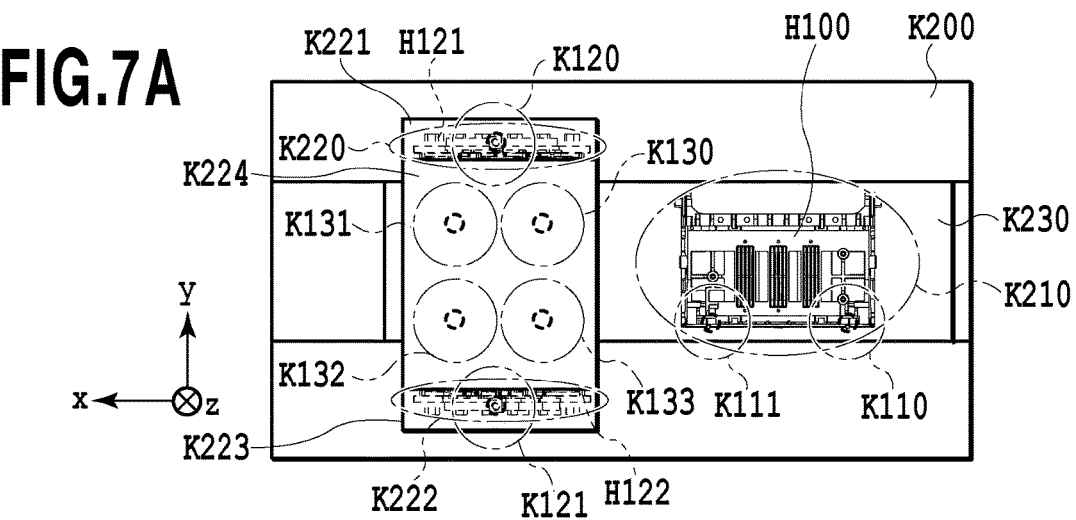
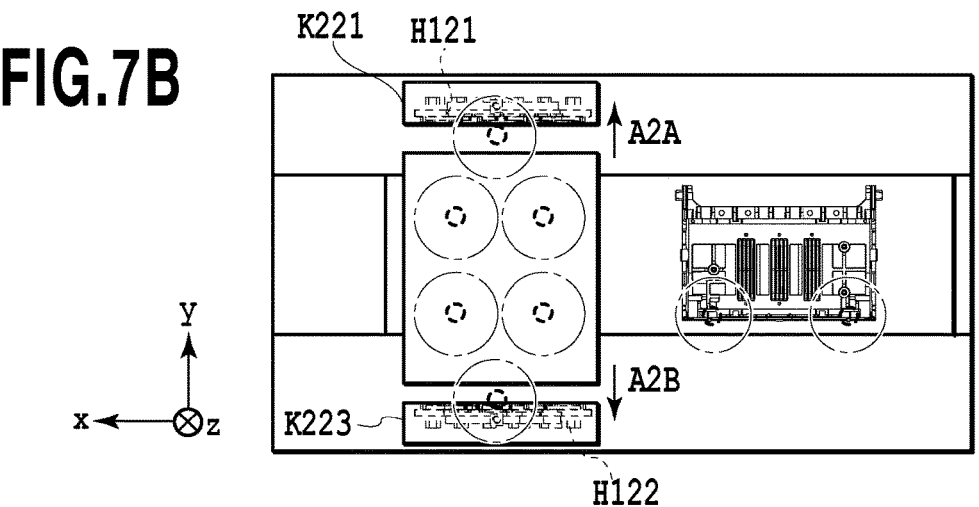
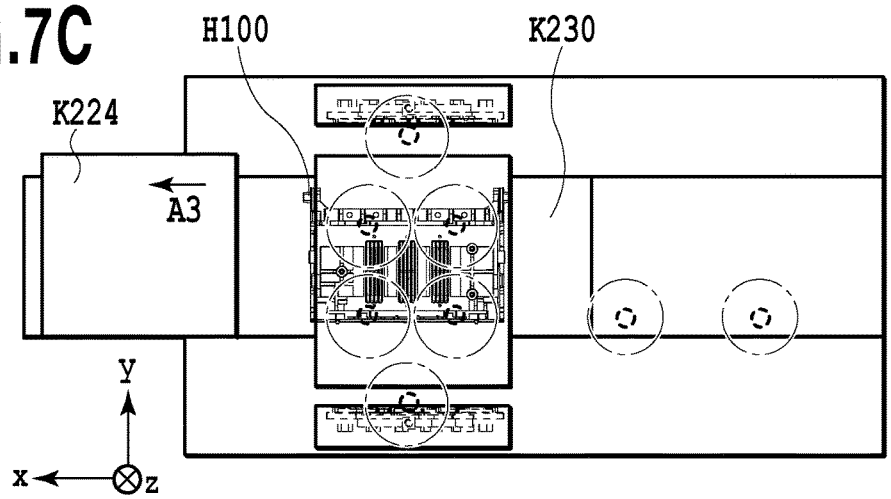

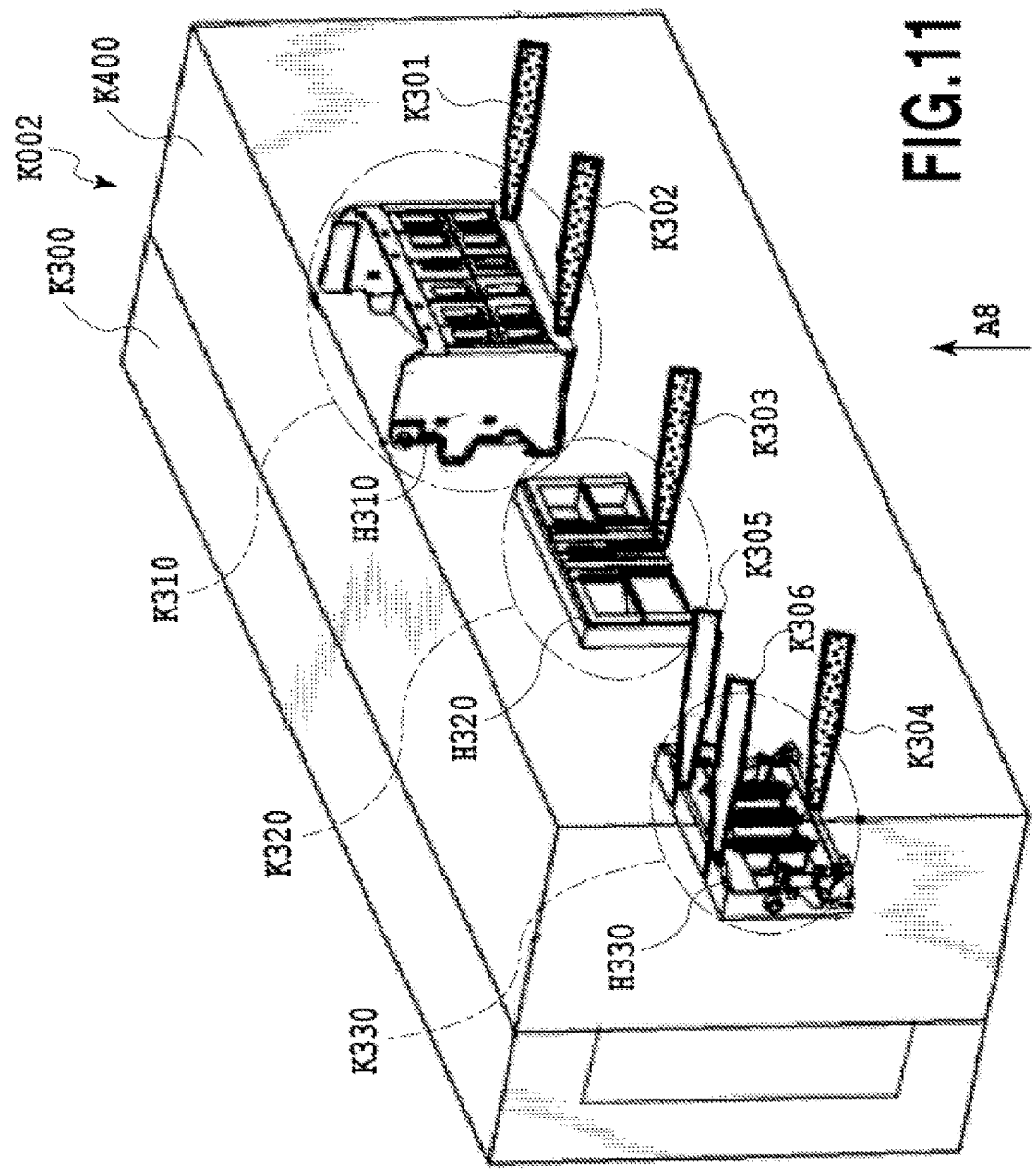

METHOD FOR MANUFACTURING LIQUID SUPPLY MEMBER

BACKGROUND OF THE INVENTION

Field of the Invention

The present invention relates to a method for manufacturing a liquid supply member for a liquid ejection apparatus, such as an inkjet printing apparatus, and more particularly, to a manufacturing method which molds and assembles a plurality of components of a liquid supply member in a mold.

Description of the Related Art

Japanese Patent Laid-Open No. 2002-178538 discloses this kind of manufacturing method. In the method, for example, two components forming a hollow body are formed at different positions in the same mold by injection molding (primary molding). After the mold is opened, one mold which holds one of the two components slides to a position where the two components come into contact with each other, relative to the other mold holding the other component. Then, the mold is closed so that the two components come into contact with each other to form the hollow body. In addition, a molten resin flows to a contact portion to join and seal the contact portion, thereby forming a sealed hollow component (secondary molding). According to this technique, it is possible to simply manufacture a liquid supply member.

However, the manufacturing method disclosed in Japanese Patent Laid-Open No. 2002-178538 brings the molded components into contact with each other and joins the molded components by steps of a mold opening operation, a mold closing operation, and a single die slid operation between the opening and closing operations. Therefore, basically, the method molds and joins only two components. That is, it is difficult for the above described method to meet the manufacture of a liquid supply member including three or more components.

SUMMARY OF THE INVENTION

An object of the invention is to provide a liquid supply member manufacturing method which can simply manufacture a liquid supply member including three or more components using a mold.

In a first aspect of the present invention, there is provided a manufacturing method for molding a liquid supply member by using a first mold and a second mold which are capable of opened and closed relative to each other and in which the first mold is capable of being slid relatively to the second mold, the method comprising: a first molding step of performing injection molding to form a first component part of the liquid supply member and a plurality of component parts of the liquid supply member other than the first component part at different positions from each other, with the first and the second mold closed relative to each other; a contacting step of moving each of the formed plurality of component parts relatively to the first component part to bring the formed first component part into contact with the formed plurality of component parts, with the first and the second mold opened relative to each other; and a second molding step of performing injection molding to join the first component part and the plurality of component parts, with the first and the second mold closed relative to each other.

In a second aspect of the present invention, there is provided a manufacturing method for molding a liquid supply member by using a first mold and a second mold which are capable of opened and closed relative to each other and in which the first mold is capable of being slid relatively to the second mold, the method comprising: a first molding step of performing injection molding to form a first component part of the liquid supply member and a plurality of component parts of the liquid supply member other than the first component part at different positions from each other, with the first and the second mold closed relative to each other; a moving step of sliding the formed plurality of component parts in a direction intersecting with a direction of sliding of the first mold relative to the second mold and with a direction of the opening and the closing the first and the second mold, with the first and the second mold opened relative to each other; a contacting step of sliding the first mold relative to the second mold and bringing each of the formed plurality of component parts into contact with the formed first component part; and a second molding step of performing injection molding to join the first component part and the plurality of component parts, with the first and the second mold closed relative to each other.

In a third aspect of the present invention, there is provided a manufacturing method for molding a liquid supply member by using a first mold and a second mold which are capable of opened and closed relative to each other and in which the first mold is capable of being slid relatively to the second mold, the method comprising: a first molding step of performing injection molding to form a first component part of the liquid supply member and a plurality of component parts of the liquid supply member other than the first component part at different positions from each other, with the first and the second mold closed relative to each other; a contacting step of sliding the first mold relatively to the second mold and bringing one of the formed plurality of component parts into contact with the first component part, with the first and the second mold opened relative to each other; a repeating step of repeating the contacting step at times according to the number of the plurality of component parts; and a second molding step of performing injection molding to join the first component part and the plurality of component parts, with the first and the second mold closed relative to each other.

According to the above-mentioned structure, in the manufacture of a liquid supply member, it is possible to simply manufacture a liquid supply member including three or more components using a mold.

Further features of the present invention will become apparent from the following description of exemplary embodiments (with reference to the attached drawings).

BRIEF DESCRIPTION OF THE DRAWINGS

FIGS. 1A and 1B are perspective views illustrating a recording head used in an inkjet recording device which is an embodiment of a liquid discharge device according to the invention;

FIGS. 6A to 6C are diagrams illustrating the molding positions and shape pieces of the liquid supply member and liquid chamber cover members in the mold;

FIGS. 7A to 7C are diagrams illustrating the operation of the mold according to the embodiment of the invention;

FIG. 11 is a perspective view illustrating a mold according to the second embodiment of the invention and components provided in the mold;

DESCRIPTION OF THE EMBODIMENTS

Hereinafter, embodiments of the present invention will be described in detail with reference to the drawings.

(First Embodiment)

FIGS. 1A and 1B are perspective views illustrating a print head used in an inkjet printing apparatus which is an embodiment of a liquid ejection apparatus according to the invention, as viewed from different angles. In FIGS. 1A and 1B, a print head H001 includes a sub-tank H030 which is provided in an upper part in FIGS. 1A and 1B and into which a liquid supplied from a container (not illustrated) that stores ink as the liquid is introduced through, for example, a tube (not illustrated) connected to a liquid inlet H010. In addition, the print head H001 includes a printing element unit H020 which ejects the liquid onto a print medium and is provided on a surface facing downward in FIGS. 1A and 1B. The print head H001 further includes a liquid supply member H100 which is connected to the sub-tank H030 and the printing element unit H020 and forms a liquid supply path.

Figure 2:
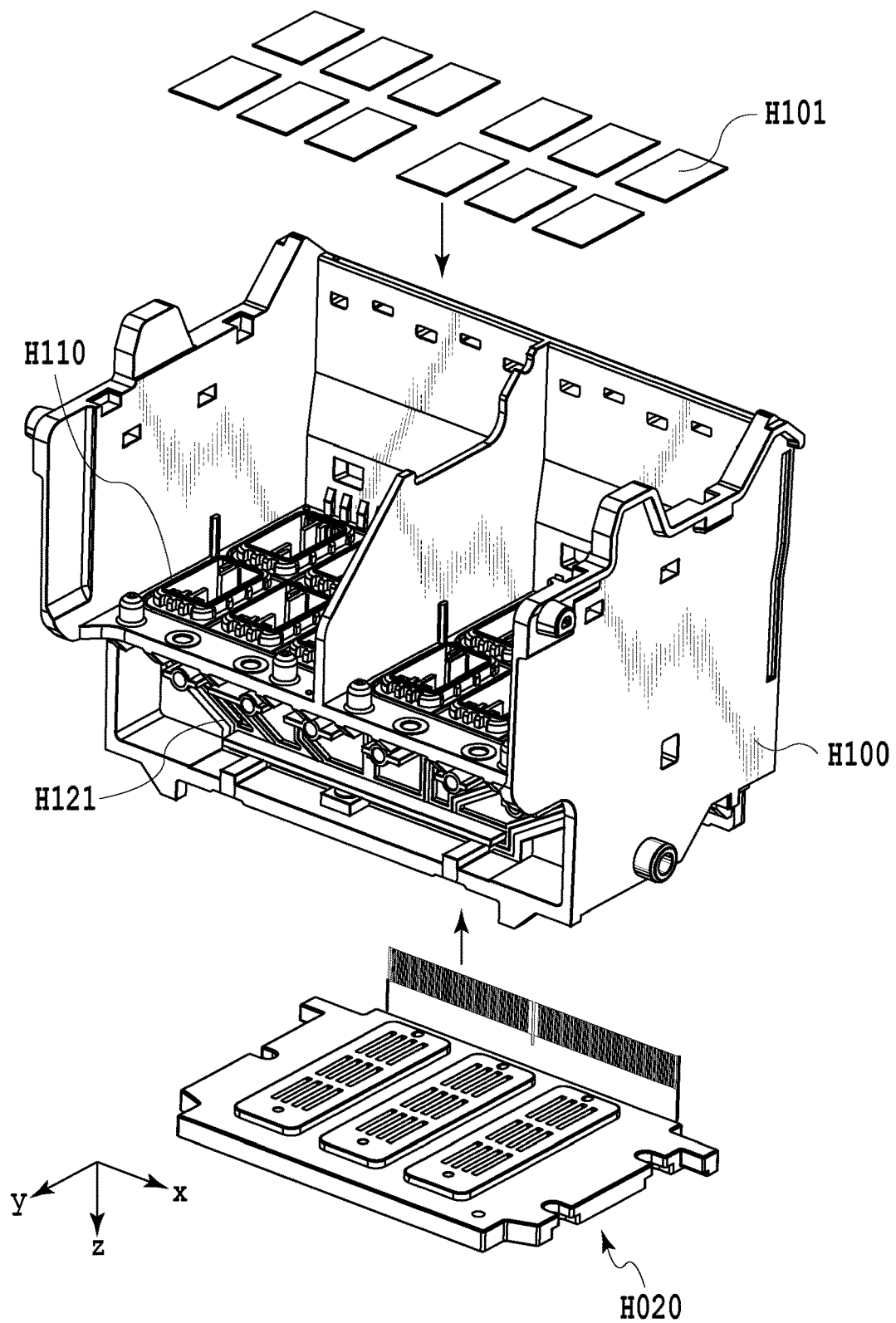
FIG. 2 is an exploded perspective view illustrating the detailed structure of a liquid supply member illustrated in FIGS. 1A and 1B.

FIG. 2 is an exploded perspective view illustrating the detailed structure of the liquid supply member H100. The liquid supply path in the liquid supply member H100 includes a filter H101 which is provided in a portion connected to the sub-tank H030 and removes foreign materials in the liquid introduced from the sub-tank. In the liquid supply path, a liquid chamber (flow path) H110 which temporarily contains the liquid is provided on the downstream side of the filter H101. In addition, the printing element unit H020 is connected to the downstream side of the liquid supply path.

Figure 3:
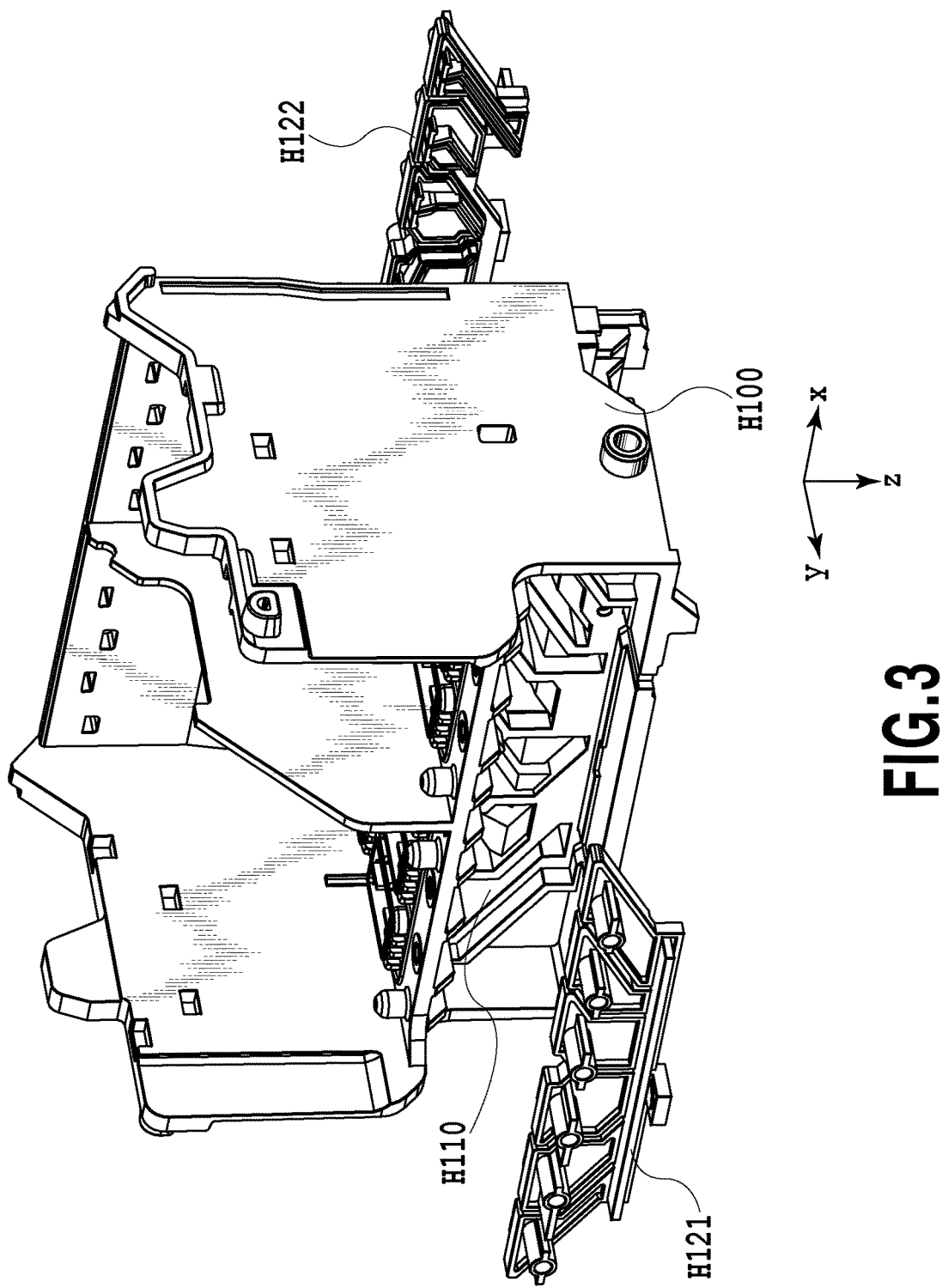
FIG. 3 is an exploded perspective view illustrating members forming a liquid chamber in the liquid supply member illustrated in FIGS. 1A and 1B.

As illustrated in FIG. 3, the liquid chamber H110 has an opening which is a connection portion with the filter H101 and an opening which is a connection portion with the printing element unit H020. In addition, respective two different side openings from the above openings are closed by liquid chamber cover members H121 and H122. As such, since the openings of a plurality of liquid chambers H110 are formed so as to be opposite to each other in terms of the structure of a mold used for manufacture, the liquid chamber cover member H121 and the liquid chamber cover member H122 have substantially the same projection area and are provided at opposite positions.

Figure 4:
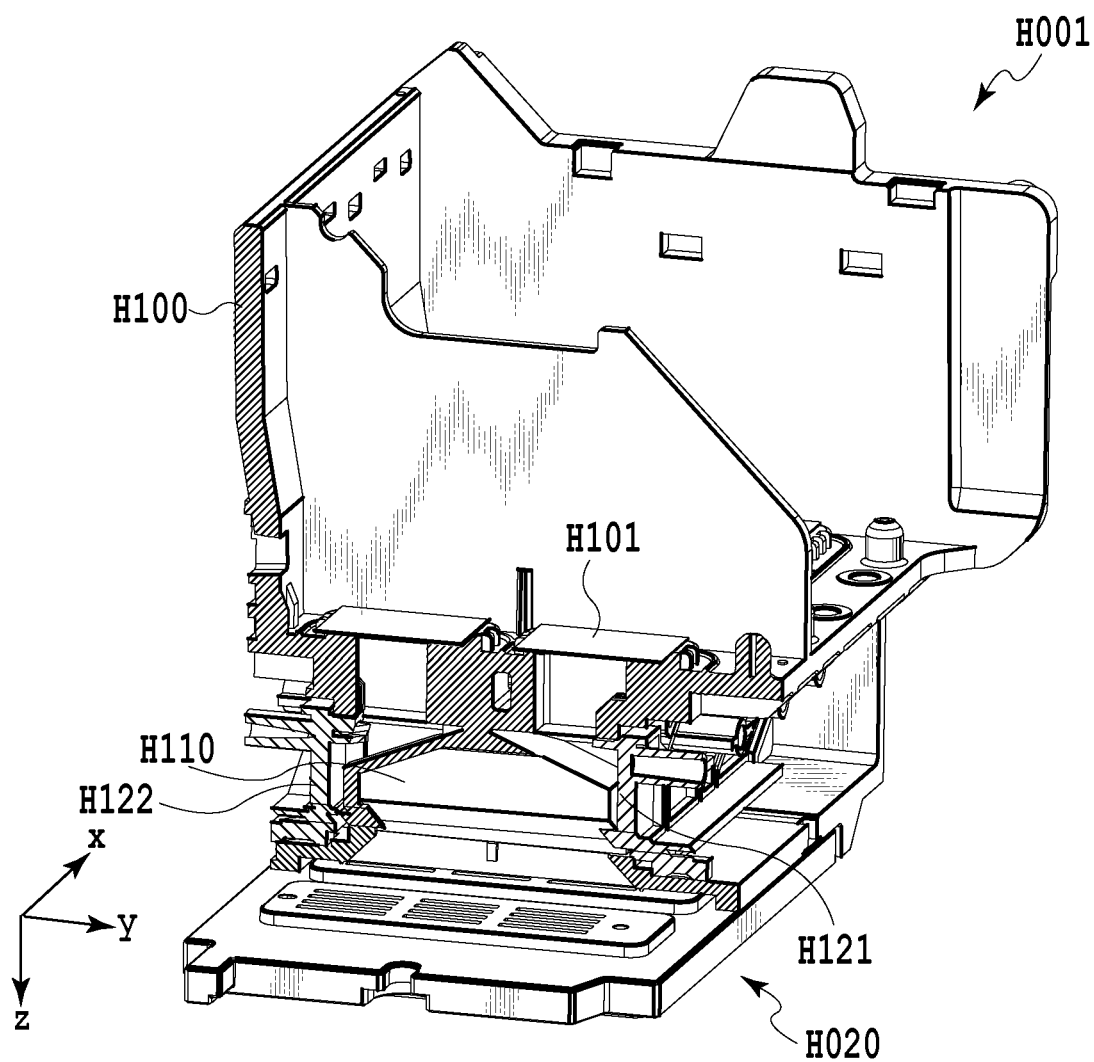
FIG. 4 is a cross-sectional view illustrating the structure of the liquid chamber in the liquid supply member illustrated in FIGS. 1A and 1B.

FIG. 4 is a cross-sectional view illustrating the structure of the liquid chamber H110 in the liquid supply member H100 and illustrates a cross section taken along the line S1-S1 of FIG. 1B. A liquid, such as ink, is introduced from the side of the filter H101 to which the sub-tank H030 (not illustrated) is connected and is temporarily stored in the liquid chamber H110. The stored liquid is supplied to the printing element unit H020 by an ejection operation of the printing element unit H020.

This embodiment manufactures the liquid supply member H100 that forms the liquid chamber H110 as a resin mold component by injection molding. In the injection molding, as illustrated in FIG. 4, when the positions or shapes of the opening on the side of the filter H101 and the opening on the side of the printing element unit H020 are different from each other and a portion between these two openings are formed by combinations of complicated sides, openings are provided on further two other sides. After the liquid chamber H110 is formed by injection molding, these two openings are closed respectively by the liquid chamber cover members H121 and H122 which are different members. More specifically, in the liquid supply member H100 including a plurality of liquid chambers H110, the directions of the openings of the liquid chambers H110 covered by the liquid chamber cover member are opposite one after the other. Since the liquid supply member H100 is a resin mold component, a piece of the mold is tapered a little in the draft direction of the piece. Therefore, the cross section of each liquid chamber H110 is reduced toward the back side of the component. That is, the thickness of a portion between adjacent liquid chambers increases toward the back side of the component. Therefore, a defect, such as a sink, occurs during molding. In order to solve the problem, a plurality of liquid chambers H110 can be formed so as to have openings in the opposite directions one after the other, which makes it possible to uniformize the thickness of a portion between the liquid chambers. As such, in the liquid supply member H100, the openings are formed on both sides of the liquid supply member H100 and the liquid chamber cover members for closing the openings are provided at opposite positions.

Next, a method for manufacturing the liquid supply member H100 using injection molding according to an embodiment of the present invention will be described.

Figure 5:
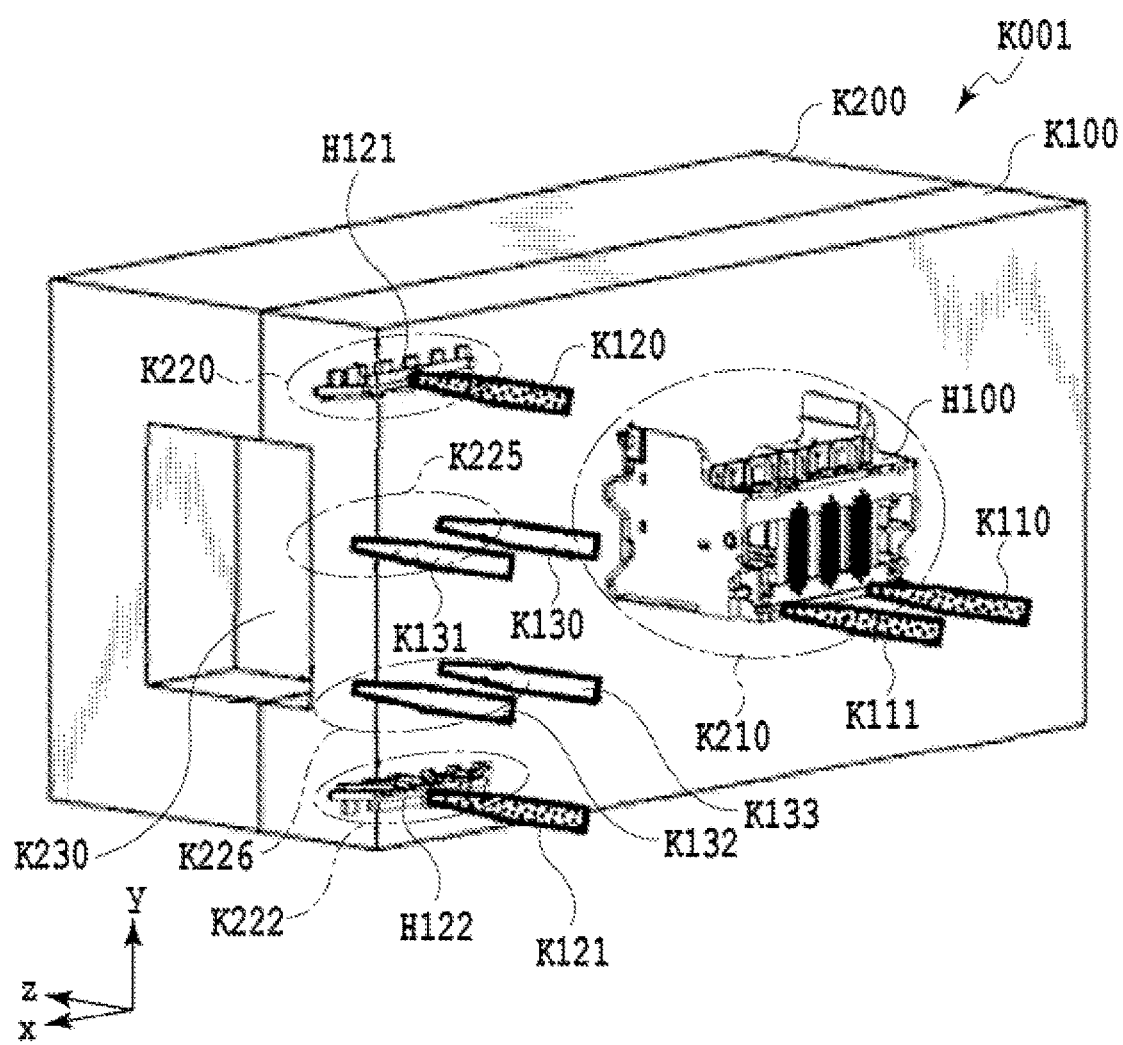
FIG. 5 is a perspective view illustrating a mold according to an embodiment of the invention.

FIG. 5 is a perspective view illustrating a mold according to an embodiment of the invention. In this embodiment, a mold K001 is made by including a stationary mold K100 and a movable mold K200. The movable mold K200 is provided with a die slide K230. The stationary mold K100 and the movable mold K200 are configured so as to be opened and closed for mold opening and mold clamping of the mold. The movable mold K200 is configured so as to slide relative to the stationary mold K100. In the mold K001, a shape piece for molding the liquid supply member H100 and shape pieces for molding the liquid chamber cover members H121 and H122 are arranged in the stationary mold K100 or the movable mold K200. In FIG. 5, reference numerals K110, K111, K120, K130, K131, K132, and K133 indicate valve gates for injecting a resin.

FIGS. 6A to 6C are diagrams illustrating the molding positions and shape pieces of the liquid supply member H100 and the liquid chamber cover members H121 and H122 in the mold. FIG. 6A is a diagram as viewed along z direction in FIG. 5 and illustrates the stationary mold K100 in a see-through manner for ease of understanding of the inside of the mold. FIG. 6B is a diagram illustrating a cross section at a first molding position K210 taken along the line S3-S3 of FIG. 6A. FIG. 6C is a diagram illustrating a cross section at a second molding position K220, a third molding position K222, a fourth molding position K225, and a fifth molding position K226 taken along the line S4-S4 and illustrates the cross-sectional structure of the valve gates at each molding position.

In FIGS. 6A to 6C, the mold K001 includes the first molding position K210 at which the liquid supply member H100 is molded, the second molding position K220 at which the liquid chamber cover member H121 is molded, and the third molding position K222 at which the liquid chamber cover member H122 is molded. In addition, the mold K001 includes the fourth and fifth molding positions K225 and K226 at which the members are contacted and joined with each other. The valve gates K110, K111, K120, K130, K131, K132, and K133 for injecting a molding material are provided at the molding positions. The shape piece of the liquid supply member H100 molded at the first molding position is formed in both of the movable mold K200 and the stationary mold K100. In addition, the shape piece of the liquid chamber cover member H121 molded at the second molding position is composed of a part piece K224 and a part slide piece K221. The shape piece of the liquid chamber cover member H122 molded at the third molding position is composed of a part piece K224 and a part slide piece K223.

FIGS. 7A to 7C and FIGS. 8A to 8C are diagrams illustrating the operation of the mold according to an embodiment of the present invention and sequentially illustrate the operation of the mold according to this embodiment for one cycle. In the drawings, the stationary mold is not illustrated for simplicity of illustration and explanation.

In the process illustrated in FIG. 7A, with the stationary mold (not illustrated) and the movable mold K200 subjected to the mold clamping, the liquid supply member H100, the liquid chamber cover member H121, and the liquid chamber cover member H122 are formed at the first molding position K210, the second molding position K220, and the third molding position K222 by injection molding, respectively (primary molding). Two valve gates K110 and K111 for injection are provided at the molding position of the liquid supply member H100 and one valve gate K120 is provided at the molding position of the liquid chamber cover member H121. In addition, one valve gate K121 is provided at the molding position of the liquid chamber cover member H122. That is, a portion other than the liquid chamber cover members H121 and H122, which is a first component part of the liquid supply member H100, the liquid chamber cover member H121 which is a second component part other than the first component part in the liquid supply member, and the liquid chamber cover member H122 which is a third component part other than the first component are formed at different positions by injection molding. After molding is performed by this process, the mold is subjected to the mold opening.

Then, in the process illustrated in FIG. 7B, with the molded liquid chamber cover member H121 held by the part slide piece K221, the part slide piece K221 is slid in the direction of an arrow A2A in FIG. 7B by a part slide mechanism (not illustrated) having a driving mechanism different from a mold opening and clamping mechanism. Similarly, with the molded liquid chamber cover member H122 held by the part slide piece K223, the part slide piece K223 is slid in the direction of an arrow A2B in FIG. 7B by the part slide mechanism. That is, the part slide pieces are slid in the directions of the arrows A2A and A2B which intersect (in this embodiment, the directions perpendicular to) a direction in which the mold K100 and the mold K200 are opened and a die slide direction which will be described below. Thereby, it is possible to evacuate the molded liquid chamber cover members H121, H122 from the path of die sliding performed in the subsequent process. In this way, in the molding method according to this embodiment, the liquid chamber cover members H121 and H122 are not evacuated by an operation of opening the movable mold and the stationary mold, but are evacuated by sliding in the directions of the arrows A2A and A2B. Thereby, the liquid chamber cover members H121 and H122 can be positioned, with the molded liquid supply member H100 interposed therebetween, and can come into contact with the liquid supply member H100, as described below. As a result, it is possible to form and assemble three components in one mold. In addition, since evacuation by sliding in the directions of the arrows A2A and A2B is not performed by a mold opening operation, it is possible to suppress an increase in the stroke of the mold opening operation.

Here, in order to evacuate the molded liquid chamber cover members H121 and H122 with the sliding of the part slide pieces K221 and K223, the force of the part slide pieces K221 and K223 holding the surfaces of the liquid chamber cover members H121 and H122 which face the part slide pieces K221 and K223 needs to be stronger than the force of the part slide pieces K221 and K223 holding the opposite surfaces of the liquid chamber cover members H121 and H122. Therefore, a plurality of sleeve structures are provided on the surfaces of the liquid chamber cover members H121 and H122 which face the part slide pieces K221 and K223 in order to increase the holding force. However, when the holding force is too strong, it is difficult to perform demolding after secondary molding. As a result, there is the risk of a finished product being damaged. For this reason, the inside of the sleeve structure (convex portion) is concave and has a conic shape having a tapered peripheral surface in order to obtain strong front and rear holding forces and a high demolding performance. A mold structure forming a taper is an insert pin structure such that a material of which the holding force is to be arbitrarily adjusted according to the material used and the structure of surrounding products can be arbitrarily changed.

In the process illustrated in FIG. 7C, with each of the part slide pieces K221 and K223 evacuated, the die slide K230 provided in the movable mold K200 is moved in the direction of an arrow A3 in FIG. 7C (die sliding is relatively performed). In this case, the molded liquid supply member H100 is held by the die slide K230 and is moved to a position where it can come into contact with the liquid chamber cover member H121 and the liquid chamber cover member H122, in the direction of the arrow A3. Similarly to the part slide mechanism, the die slide K230 is driven by a driving mechanism different from the mold opening and closing mechanism.

Figure 8A:
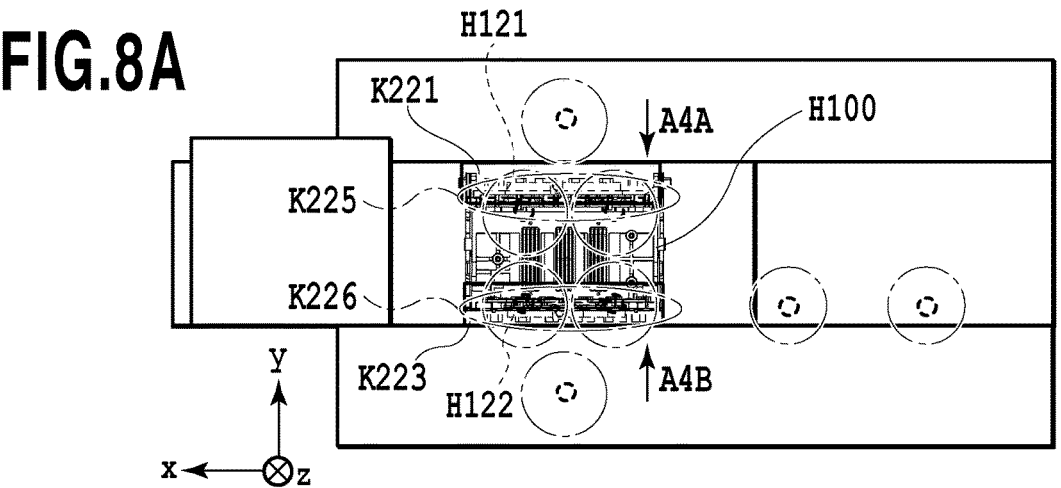
FIGS. 8A to 8C are diagrams illustrating the operation of the mold according to the embodiment of the invention.

Then, in the process illustrated in FIG. 8A, the molded liquid chamber cover members H121 and H122 which are held by the part slide pieces K221 and K223 are moved to the fourth and fifth molding positions K225 and K226 in the directions of arrows A4A and A4B in FIG. 8A by a return operation of the part slide mechanism, respectively, so as to come into contact with each opening portion of the liquid chambers H110 in the liquid supply member H100. The valve gates K130, K131, K132, and K133 for injecting a material are also provided at the fourth and fifth molding positions K225 and K226.

Here, the valve gates provided in the mold according to this embodiment have the same structure and have the cross-sectional size represented by a dashed line in the drawings. Therefore, when the valve gates are arranged so as to be adjacent to each other, they need to be arranged at a pitch that is equal to or greater than the diameter of the circle. The valve gate for molding the liquid chamber cover member and the valve gates provided at the fourth and fifth molding positions are arranged so as not to be adjacent to each other since they need to be arranged at a pitch that is equal to or greater than the diameter of the circle in the cross-sectional view of the valve gates. Therefore, in this embodiment, the molding position of each liquid chamber cover member is different from the fourth and fifth molding positions. That is, the part slide mechanism has stop positions for the second and third molding positions where the liquid chamber cover member is molded, an evacuation position for evacuation from a die slide path, and the positions where the liquid supply member H100 is contacted and joined with each liquid chamber cover member.

Then, the mold is subjected to the mold clamping with the opening portions of the liquid chambers H110 in the liquid supply member H100 coming into contact with the liquid chamber cover members H121 and H122 at the fourth and fifth molding positions K225 and K226.

Figure 8B:
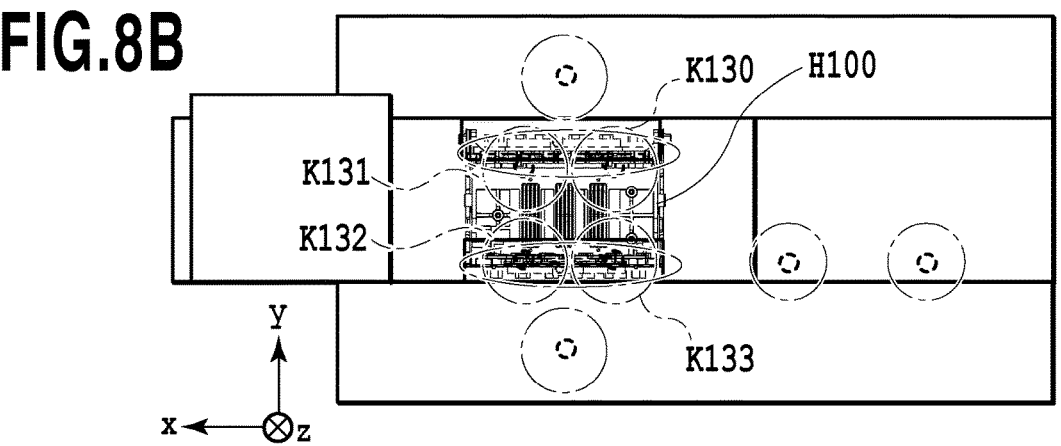

Then, in the process illustrated in FIG. 8B, the contact portions between the liquid chamber cover members H121 and H122 and the opening portions of the liquid chambers H110 in the liquid supply member H100 are filled with a material which is compatible with the liquid supply member H100 and the liquid chamber cover members, without any space therebetween, such that the liquid supply member H100 and the liquid chamber cover members are hermetically joined with each other. The sealing material includes filler. In the liquid chamber H110, a hollow portion with a sealed structure is formed by filling with the material except for openings which are connected to the sub-tank H030 and are on the side of the filter H101 and openings on the side of the printing element unit H020.

At that time, the filling pressure of a filling resin for sealing is applied to the contact portions between the liquid chamber cover members H121 and H122 and the opening portions of the liquid chambers H110 in the liquid supply member H100. The mold pieces K221 and K223 holding the liquid chamber cover members H121 and H122 are pressed against the liquid supply member H100 by pressure corresponding to the filling pressure in order to maintain an appropriate contact state. At that time, since the liquid chamber cover member H121 and the liquid chamber cover member H122 have substantially the same projection area, the same pressure is applied to the same area in the opposite directions in the liquid chamber cover member H121 and the liquid chamber cover member H122. Therefore, it is possible to suppress the deformation of the liquid supply member and to prevent, for example, the leakage of the filling resin for sealing.

Figure 8C:
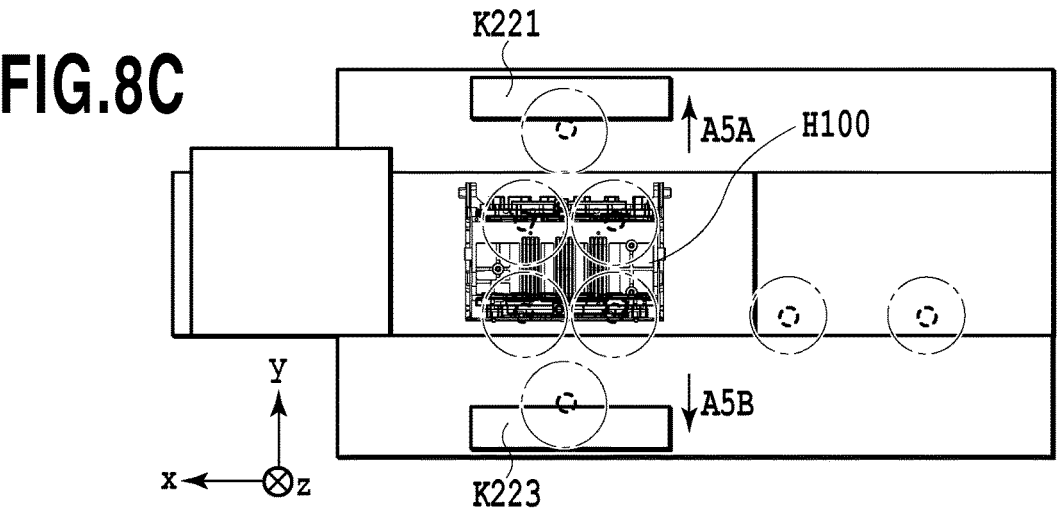

Finally, in the process illustrated in FIG. 8C, the mold K001 is opened and the part slide pieces K221 and K223 are moved in the directions of arrows A5A and A5B in FIG. 8C, respectively. In addition, the liquid supply member H100 in which the sealed hollow structure has been completed is pushed out and is taken out of the mold K001.

The use of the mold K001 having the structure that performs the above-mentioned operation makes it possible to easily manufacture a liquid supply member of a recording head which is corrected by three components.

(Second Embodiment)

Figure 9:
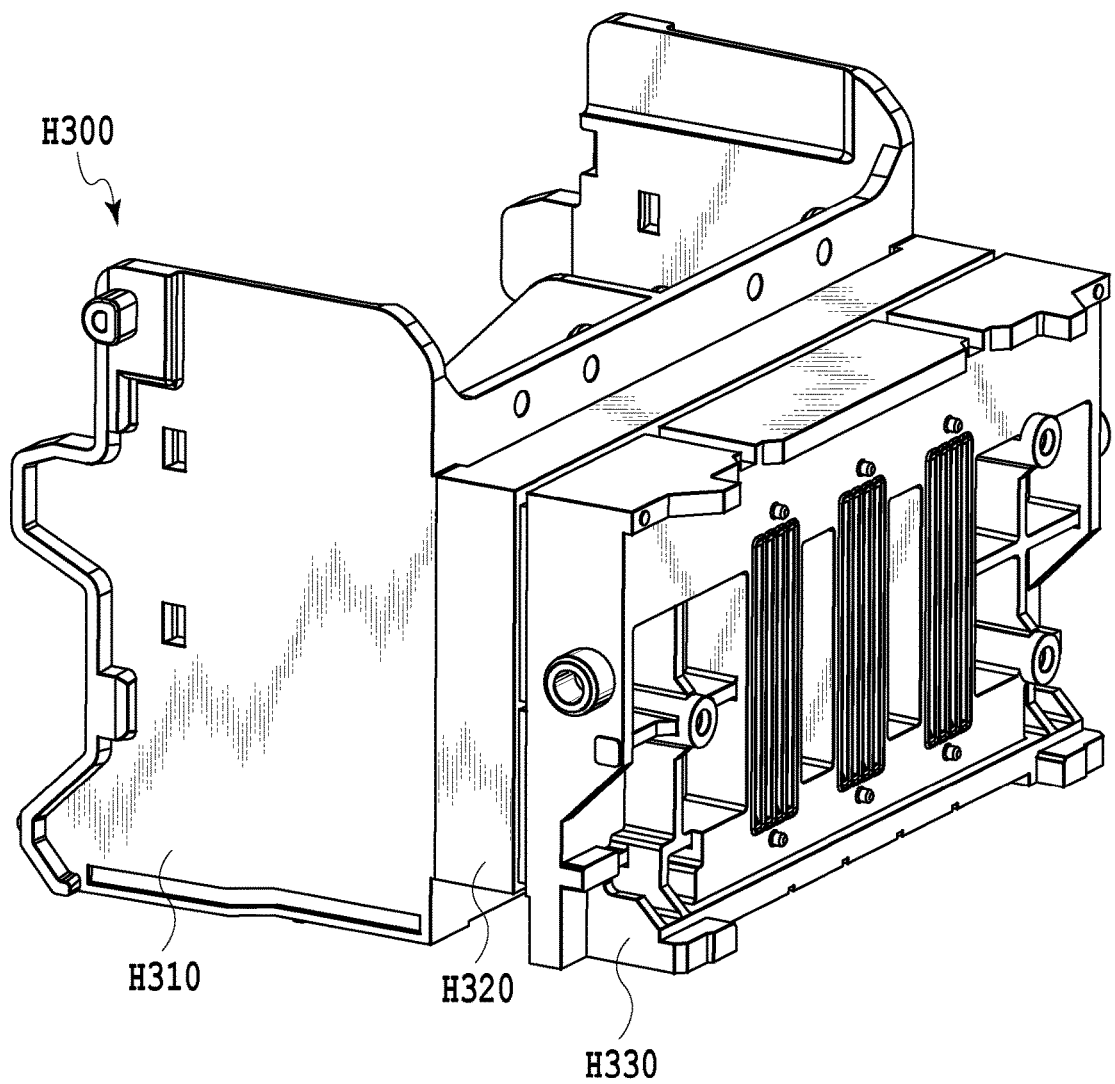
FIG. 9 is a perspective view illustrating a liquid supply member of an inkjet recording head according to a second embodiment of the invention.

FIG. 9 is a perspective view illustrating a liquid supply member of an inkjet recording head according to a second embodiment of the present invention. As illustrated in FIG. 9, a liquid supply member H300 according to this embodiment is configured such that three components H310, H320, and H330 overlap each other.

Figure 10:
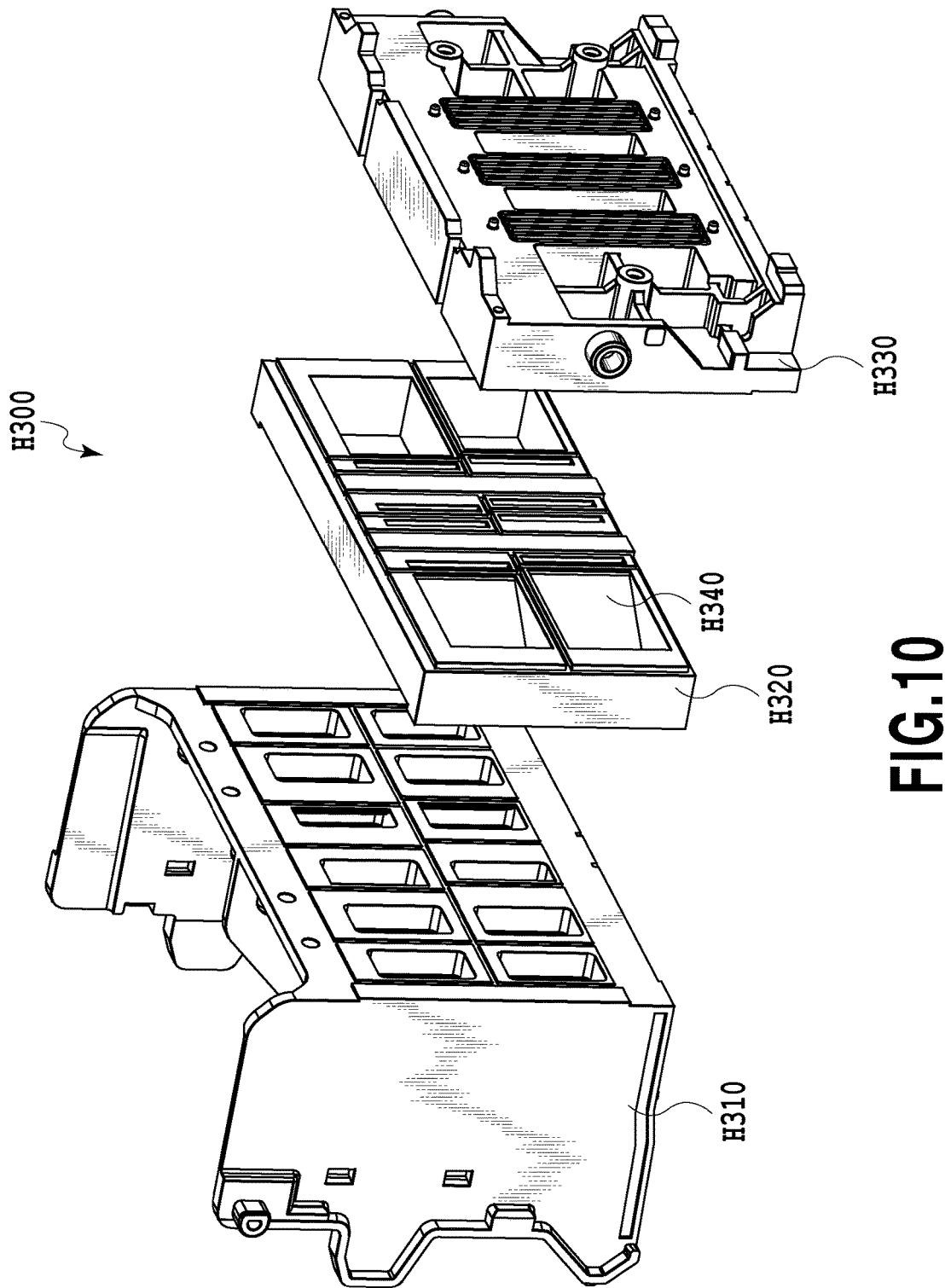
FIG. 10 is an exploded perspective view illustrating the liquid supply member illustrated in FIG. 9.

FIG. 10 is an exploded perspective view illustrating the liquid supply member H300 illustrated in FIG. 9. Similarly to the first embodiment, the liquid supply member H300 includes a plurality of liquid chambers H340 provided therein. The liquid chamber H340 includes a filter attachment portion and a printing element unit attachment portion for ejecting a liquid in two opposite directions. Openings formed in each direction in the liquid chamber H340 have a cross-sectional area that is less than the cross-sectional area of the liquid chamber. Therefore, in this embodiment, when the liquid supply member is manufactured by injection molding, three components are separately molded and come into contact with each other, and the contact portions are joined with each other to form the liquid supply member and the liquid chambers, as illustrated in FIG. 10.

FIG. 11 is a perspective view illustrating a mold according to the second embodiment of the present invention and components provided in the mold. A mold K002 is configured by including a movable mold K300 and a stationary mold K400. The mold has a first molding position K310 where the component H310 is molded, a second molding position K320 where the component H320 is molded, and a third molding position K330 where the component H330 is molded. In addition, the mold K002 includes valve gates K301, K302, K303, and K304 corresponding to the molding positions.

FIGS. 12A to 12D and FIGS. 13A to 13D are diagrams illustrating operations for forming the liquid supply member according to the second embodiment of the present invention using injection molding and sequentially illustrate the operations for one cycle. FIGS. 12A to 12D and FIGS. 13A to 13D are diagrams as viewed from the direction of an arrow A8 in FIG. 11.

Figure 12A:
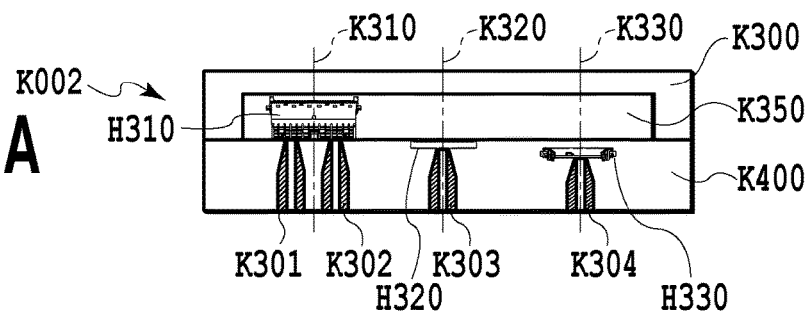
FIGS. 12A to 12D are diagrams illustrating an operation of forming the liquid supply member according to the second embodiment of the invention using injection molding.

In the process illustrated in FIG. 12A, one cycle of injection molding starts, with the movable mold K300 and the stationary mold K400 closed. In this cycle, three components H310, H320, and H330 of the liquid supply member are formed at the first molding position, the second molding position, and the third molding position by injection molding, respectively. In this case, a molding resin is injected from the valve gates K301, K302, K303, and K304 arranged at the molding positions. The third molding position where the component H330 is molded is recessed by a distance corresponding to the thickness of the component H320 in the vertical direction of FIG. 12A (a direction in which the mold is subjected to the old opening and the mold clamping). Therefore, in the process illustrated in FIG. 13C which will be described below, it is possible to appropriately bring the component H320 into contact with the component H330.

Figure 12B:
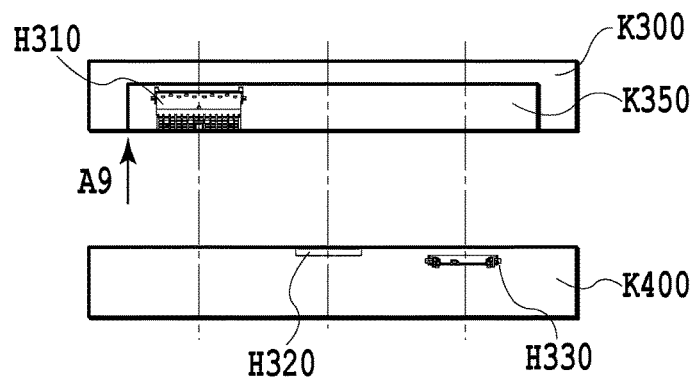

Then, in the process illustrated in FIG. 12B, the movable mold K300 is moved in the direction of an arrow A9 in FIG. 12B and the mold K002 is opened. In this case, the component H310 molded at the first molding position K310 is moved together with the movable mold K300 while being held by the movable mold K300. In addition, the component H320 molded at the second molding position K320 and the component H330 molded at the third molding position K330 are held by the stationary mold K400 and are not moved.

Figure 12C:
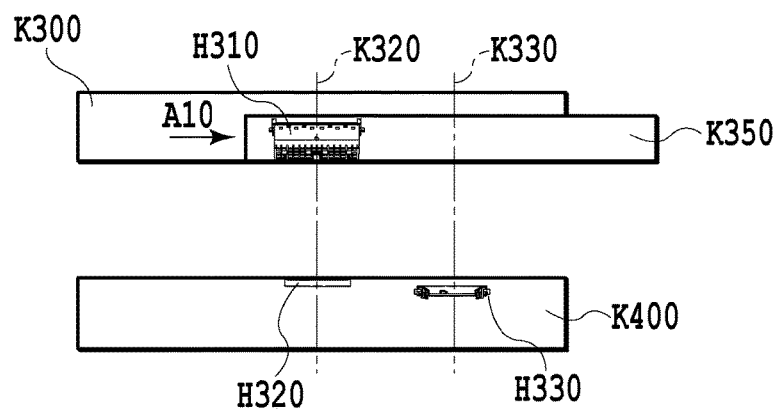

Then, in the process illustrated in FIG. 12C, the movable mold K300 having the component H310 held therein is moved to the position where the component H310 faces the component H320 in the stationary mold K400 in the direction of an arrow A10. This movement is performed by a die slide mechanism K350 that can slide in the direction of an arrow A10 in the movable mold K300. The outer edge of the movable mold K300 is not moved and only the die slide mechanism K350 is moved.

Figure 12D:
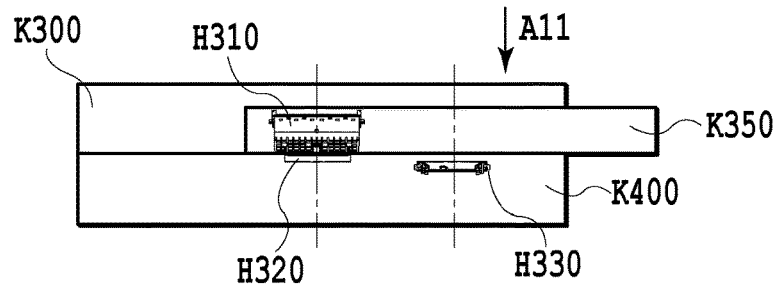

Then, in the process illustrated in FIG. 12D, the movable mold K300 is moved to the stationary mold K400 in the direction of an arrow A11 and the mold K002 is closed. In this case, a portion forming the liquid chamber, which is in the component H310 held by the movable mold K300, comes into contact with a portion forming the liquid chamber, which is in the component H320 held by the stationary mold K400, and is temporarily fixed by, for example, partial welding, press fitting, or an arc-shaped hooking structure.

Figure 13A:
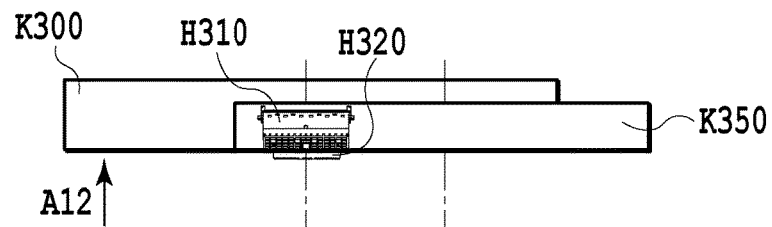
FIGS. 13A to 13D are diagrams illustrating the operation of forming the liquid supply member according to the second embodiment of the invention using injection molding.

Then, in the process illustrated in FIG. 13A, the movable mold K300 in which the component H310 and the component H320 are held while being temporarily fixed is moved in the direction of an arrow A12. Then, the mold opening is performed.

Figure 13B:
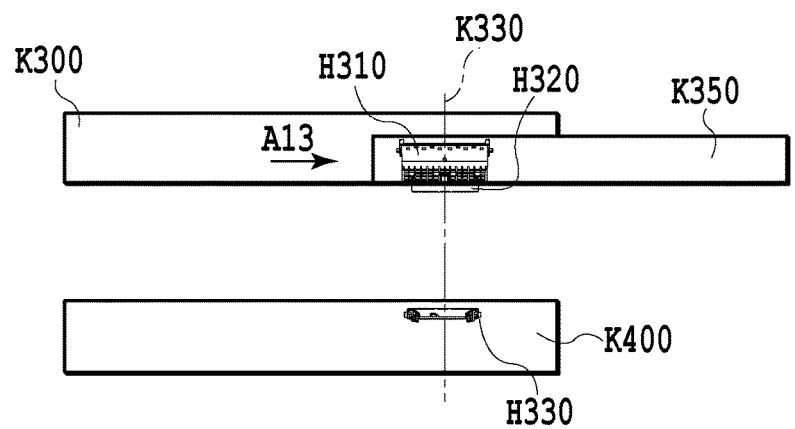

Then, in the process illustrated in FIG. 13B, the die slide mechanism K350 moves the movable mold K300 to the position where the component H310 and the component H320 face the component H330 in the stationary mold K400 in the direction of an arrow A13, while maintaining the temporarily fixed state of the component H310 and the component H320.

Figure 13C:
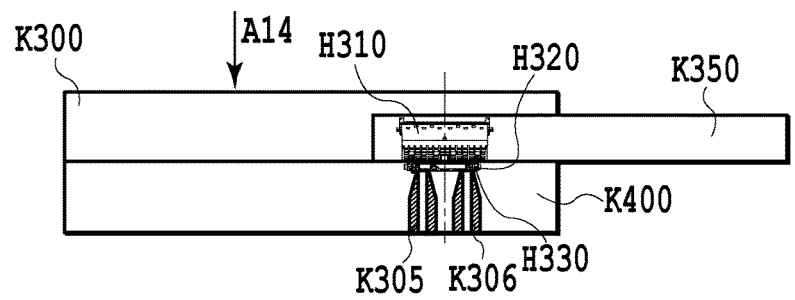

Then, in the process illustrated in FIG. 13C, the movable mold K300 is moved to the stationary mold K400 in the direction of an arrow A14 and the mold K002 is closed. In this operation, in the component H320 held by the movable mold K300, a portion which forms the liquid chamber and is opposite to the component H310 comes into contact with a portion which forms the liquid chamber in the component H330 held by the stationary mold K400. Then, a contact portion between the component H310 and the component H320 and a contact portion between the component H320 and the component H330 are filled with the same molding material as that used to mold the components H310, H320, and H330 through the valve gates K305 and K306.

In this case, the filling pressure of the filling material for sealing is applied to each contact portion of the liquid chamber. The components H310, H320, and H330 need to be pressed by pressure corresponding to the filling pressure in order to maintain an appropriate contact state. That is, it is preferable that the components H310 and H330 be pressed against the component H320 from two opposite sides by the same force. At that time, the contact portion between the component H310 and the component H320 and the contact portion between the component H330 and the component H320 have substantially the same projection area. Therefore, the same pressure is applied to the same area in the opposite directions to suppress the deformation of the liquid supply member and to prevent, for example, the leakage of a filling material for sealing. As a result, the component H310 and the component H320 are appropriately fixed and the component H320 and the component H330 are appropriately fixed so that each contact portion of the liquid chamber is hermetically sealed.

Figure 13D:
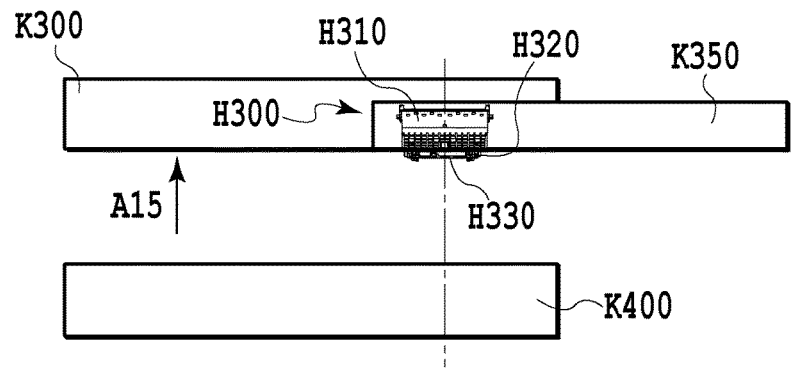

Finally, in the process illustrated in FIG. 13D, the movable mold K300 is moved in the direction of an arrow A15. Then, the mold is subjected to the mold opening and the liquid supply member in which three components are fixed and hermetically sealed is taken out of the mold.

The materials with which each contact portion is filled may be different from each other as long as they are compatible with the material forming each component. In this case, the same effect as described above is obtained. In addition, when the component H310 and the component H320 come into contact with each other, temporary fixation (FIG. 12D) by, for example, partial welding, press fitting, or an arc-shaped hooking structure may be a sealing and joining process which fills the contact portion with a sealing material. In this case, only the contact portion between the component H320 and the component H330 is filled with the sealing material when three components come into contact with each other.

It is possible to simply manufacture a liquid supply member including three components using the mold having the above-mentioned structure and the above-mentioned processes.

(Third Embodiment)

Figure 14A:
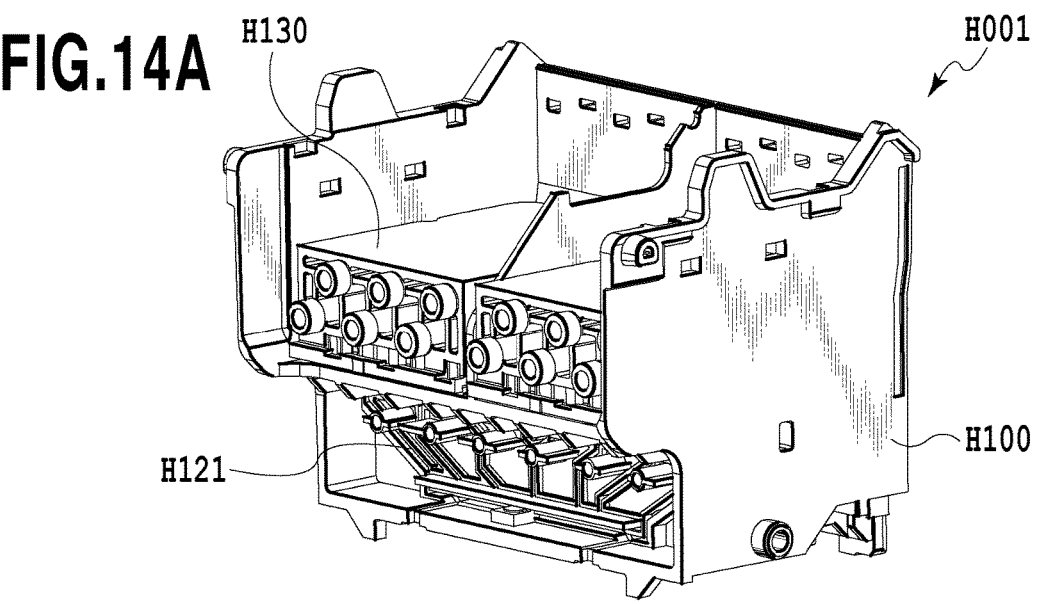
FIGS. 14A and 14B are perspective views illustrating a liquid supply member of an inkjet recording head according to a third embodiment of the invention.
Figure 14B:
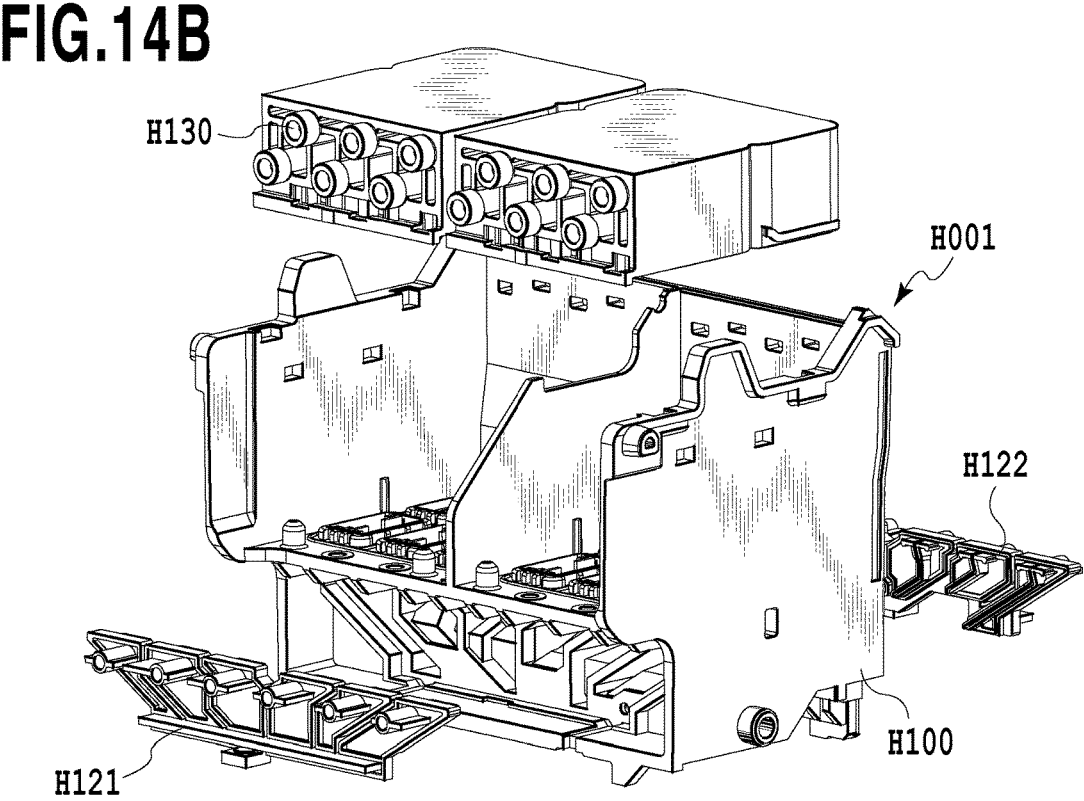

FIGS. 14A and 14B are perspective views illustrating a liquid supply member of an inkjet recording head according to a third embodiment of the invention. As illustrated in FIG. 14B, the mold according to the first embodiment, the second embodiment, or a combination of the first and second embodiments and the operation of the mold can be applied to a structure including four components, that is, the liquid supply member H100, the liquid chamber cover members H121 and H122, and a component H130 having a structure for connecting, for example, a tube (not illustrated) for supplying a liquid and the structure including four components can be manufactured by injection molding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-105149, filed May 25, 2015, which is hereby incorporated by reference wherein in its entirety.

What is claimed is:

1. A manufacturing method for molding a liquid supply member by using a first mold and a second mold, which are capable of being opened and closed relative to each other and in which the first mold is capable of being slid relatively to the second mold, the method comprising:
   a first molding step of performing injection molding to form a first component part, a second component part, a third component part of the liquid supply member at different positions from each other, with the first and the second mold closed relative to each other;
   an evacuation step of evacuating the second and the third component parts that have been formed in a direction intersecting with a direction of opening and closing of the first mold and the second mold, with the first and the second mold opened relative to each other;
   a moving step of sliding the first mold relative to the second mold in a direction intersecting with the direction of opening and closing of the first mold and the second mold and with the direction of evacuating of the second and the third component parts;
   a contacting step of moving the second and the third component parts in a direction opposite to the direction of evacuating and bringing each of the second and the third component parts that have been formed into contact with the first component part that has been formed; and
   a second molding step of performing injection molding to join the first component part and the second and the third component parts, with the first and the second mold closed relative to each other, wherein the first component part is located between the second component part and the third component part in the second molding step.

2. The manufacturing method according to claim 1, wherein the first component part is overlapped with the second and the third component parts when they are brought into contact in the contacting step.

3. The manufacturing method according to claim 2, wherein the first component part and the second and the third component parts have substantially a same projection area in a direction in which the first component part and the second and the third component parts are overlapped.

4. The manufacturing method according to claim 1, wherein the second and the third component parts are joined to the first component part to form a hollow portion in the liquid supply member.

5. The manufacturing method according to claim 1, wherein an injection molding material in the second molding step is a same material as a material of the first, the second, and the third component parts.

6. The manufacturing method according to claim 1, wherein an injection molding material in the second molding step includes a filler.

7. The manufacturing method according to claim 1, wherein the first, the second, and the third component parts are joined to form a flow path for supplying ink to a printing element part for ejecting ink.

* * * * *